United States Patent [19]

Kemp et al.

[11] Patent Number: 4,711,643

[45] Date of Patent: Dec. 8, 1987

[54] STABILIZED COAL OIL MIXTURES

[75] Inventors: Paul C. Kemp, Catlettsburg; Walter Lyons, Ashland; Ricky E. Music, Catlettsburg, all of Ky.

[73] Assignee: Ashland Oil, Inc., Ashland, Ky.

[21] Appl. No.: 331,444

[22] Filed: Dec. 14, 1981

[51] Int. Cl.[4] ................................. C10L 1/32
[52] U.S. Cl. .......................... 44/51; 252/309
[58] Field of Search ............................ 44/51; 252/309

[56] References Cited

U.S. PATENT DOCUMENTS

| | | | |
|---|---|---|---|
| 1,681,335 | 8/1928 | Griessbach . | |
| 3,629,139 | 12/1971 | Vossos | 252/309 |
| 3,652,329 | 3/1972 | Vossos | 252/309 |
| 4,018,729 | 4/1977 | Faucher et al. | 260/17 R |
| 4,088,453 | 5/1978 | Wiese et al. | 44/51 |
| 4,089,657 | 5/1978 | Keller | 44/51 |
| 4,094,810 | 6/1978 | Thomas | 252/313 |
| 4,130,401 | 12/1980 | Meyers et al. | 44/51 |
| 4,149,854 | 4/1979 | Kohn | 44/51 |
| 4,195,975 | 4/1980 | Hamuro et al. | 44/51 |
| 4,201,552 | 5/1980 | Rowell et al. | 44/51 |
| 4,242,098 | 12/1980 | Braun et al. | 44/51 |
| 4,251,230 | 2/1981 | Sawyer, Jr. | 44/51 |

FOREIGN PATENT DOCUMENTS 53-123408  10/1978  Japan .

OTHER PUBLICATIONS

Dev. of Stab. for Coal-Oil Mixtures.

Primary Examiner—William R. Dixon, Jr.
Assistant Examiner—Jerry Johnson
Attorney, Agent, or Firm—Richard C. Willson, Jr.

[57] ABSTRACT

Improved stabilizers for use in coal-oil mixtures are disclosed and comprise quaternary ammonium hydroxides, preferably they are formed by the reaction of a molar excess of sodium hydroxide or lithium hydroxide with a quaternary ammonium salt.

8 Claims, No Drawings

STABILIZED COAL OIL MIXTURES

BACKGROUND OF THE INVENTION

It has long been recognized that stable suspensions of pulverized coal and a liquid hydrocarbon are desirable mixtures for use as commercial fuels. Numerous attempts have been made to form stable mixtures of crushed coal and crude or refined hydrocarbons. Many attempts have failed because equipment with high energy requirements has been required. Other attempts have failed because water has been required, thus reducing the BTU content of the resultant mixture. Other procedures have failed due to the instability of the resultant mixture.

In an attempt to provide stable mixtures the prior art is replete with attempts to include chemical compounds that will stabilize the mixture so that the coal remains suspended in the liquid hydrocarbon. The degree of success of these stabilizers has varied from ones that are not effective to those that represent a significant improvement in comparison to no stabilizer at all. However, such stabilizers still fail to achieve all desired performance characteristics.

In Japanese Patent Application No. 53-123408 published Oct. 27, 1978, there are disclosed quaternary ammonium salts where the salt radical includes a halogen atom. One commercially available example of such a compound is dicocodimethylammonium chloride having the structure

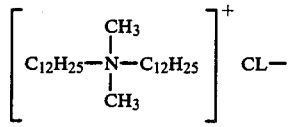

and sold under the trademark Arquad 2C-75 by Armak Industrial Chemical Division of Armak Company, Inc.

Rowell et al U.S. Pat. No. 4,201,552 discloses a tertiary amine or a quaternary ammonium salt that contains the group, $N-CH_2-C-CH_2-O-$. This quaternary ammonium salt is stated to be available under the trademark Atlas G-271. In a subsequent publication by the inventors the compounds of the above Japanese Patent Application are described as being more effective than Atlas G-271.

It has been one objective of this invention to provide an effective coal-oil mixture stabilizer. It has been another objective to provide such a stabilizer that does not significantly increase the viscosity of the coal oil mixture to a point where it is not readily pumpable with conventional equipment. Another important objective has been to provide a stabilizer that significantly increases the length of time the mixture can be stored without significant sedimentation occurring. These and other objectives will become more apparent from the following description.

SUMMARY OF THE INVENTION

Coal-oil mixtures are stabilized through the inclusion of a compound having the following structural formula:

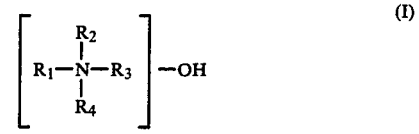

wherein $R_1$, $R_2$, $R_3$ and $R_4$ are alkyl groups of 1 to 25 carbon atoms and preferably, $R_1$ and $R_3$ are alkyl groups having 1 to 12 carbon atoms, and $R_2$ and $R_4$ are alkyl groups having 1 to 5 carbon atoms.

The stabilizers are prepared by reacting a compound having the following structural formula with a molar excess of sodium or lithium hydroxide.

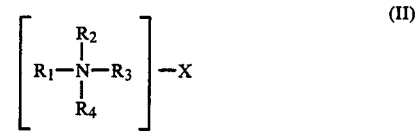

wherein $R_1$, $R_2$, $R_3$ and $R_4$ are like the above in formula II, and X is halogen.

The stabilizer may be added to the coal-oil mixture as compound (I) above or it may be formed in situ in the mixture by adding the compound of formula II and the sodium or lithium hydroxide to the coal-oil mixture.

The stabilizer is included in an amount of about 0.05 to 5.0% by weight of the coal-oil mixture.

DETAILED DESCRIPTION OF THE INVENTION

In preparing the coal-oil mixtures of the present invention the coal employed may be mined or processed by any conventional method and may be "run-of-mine", beneficiated coal or mixtures thereof. The coal should be crushed so that about 100% will push through a 50 mesh sieve and at least 70% through a 200 mesh sieve. Smaller sizes generally increase the viscosity of the resultant product and the cost of processing.

The liquid hydrocarbon to which the coal is added may be crude or refined hydrocarbon based liquids. While any such material may be used the residual heavy fuel group, Number 6, is preferred for economic reasons.

Analysis of a typical oil and a typical coal that may be utilized is provided in Table I. The amount of coal added to the liquid hydrocarbon fuel may vary depending on use requirements. Coal concentrations above 55% by weight create viscosity related problems while below 30% by weight are generally uneconomical. Other solid, particulate, carbonaceous materials could be employed.

TABLE I

Coal/Oil Mixture Component Properties
COAL ANALYSIS

| Sieve Analysis, wt. % | |
|---|---|
| 50 mesh | 0 |
| 50 100 mesh | 0.6 |
| 100 200 mesh | 27.0 |
| 200 325 mesh | 46.2 |
| 325 mesh | 26.2 |
| Pyritic Sulfur, wt. % | 0.16 |
| Sulfate Sulfur, wt. % | 0.007 |
| Organic Sulfur, wt. % | 0.67 |
| Total Sulfur, wt. % | 0.84 |
| Moisture, wt. % | 1.1 |
| Volatiles, wt. % | 33.4 |
| Fixed Carbon, wt. % | 52.4 |

TABLE I-continued

Coal/Oil Mixture Component Properties
COAL ANALYSIS

| | |
|---|---|
| Ash, wt. % | 13.2 |
| Chlorine, wt. % | 0.09 |
| Carbon, wt. % | 73.77 |
| Hydrogen, wt. % | 4.99 |
| Nitrogen, wt. % | 1.25 |
| Gross Heating Value, Gross Btu lb. | 12,899 |

OIL ANALYSIS

| | |
|---|---|
| BS & W Vol. % | 0.3 |
| Rams Carbon, wt. % | 13.8 |
| Gravity, °API | 10.7 |
| Viscosity at 122° F., SFS | 141.1 |
| Heptane Insolubles, wt. % | 3.69 |
| Gross Heating Value, Gross Btu lb. | 18,311 |

In the practice of the present invention a compound corresponding to formula (I) is prepared from a compound corresponding to formula (II) and a molar excess of sodium hydroxide or lithium hydroxide. For reasons not presently understood, the results achieved from using these two bases are significantly better than those where potassium or calcium hydroxide are used.

If a solution is desired, the quaternary ammonium hydroxide stabilizer of formula (I) above may be dissolved in an aliphatic alcohol containing 1 to 10 carbon atoms. A mixture of 25 to 100% by weight stabilizer and 0 to 75% by weight alcohol is suitable.

In use, when the coal mixture is prepared, approximately 0.05% to 20% by weight of stabilizer, and preferably 0.5% to 5% by weight, based on the weight of the coal-oil mixture, is added. The mixture can be prepared by any suitable means.

As noted, the stabilizer of the present invention may be prepared and then added to the coal oil mixture or it may be prepared in situ by adding the required reactants to a coal-oil mixture and permitting them to react and form the stabilizer of formula (I) above.

The following examples will serve to explain how the stabilizers of the present invention may be prepared and used and how their performance compares to several prior art stabilizers.

EXAMPLE I

A stabilized coal-oil mixture of the present invention and designated 38-6-B22 is produced in the following manner.

In a beaker 0.78 gm. of NaOH(25% $H_2O$) is added to 0.78 gm. of Arquad 2C-75 having the structure shown on Page 2 hereof. The Arquad 2C-75 contains about 25% isopropanol so as to form a solution of the quaternary ammonium chloride compound. The reaction to form the quaternary ammonium hydroxide proceeds very rapidly and the mixture separates into two phases, one containing the quaternary ammonium hydroxide and the other propanol and water. The quaternary ammonium hydroxide is separated by using a conventional separatory funnel.

In order to test its effectiveness as a coal-oil stabilizer the following tests are performed against one stabilizer disclosed in Rowell et al U.S. Pat. No. 4,201,552, e.g., Atlas G-271. For test purposes it is designated 54-2-B22.

Mixtures of No. 6 fuel oil, pulverized coal and the stabilizers are prepared with the coal and oil of Table I. The weight percents of each are set forth in Table II.

TABLE II

| | Coal/Oil Mixture Preparation | | |
|---|---|---|---|
| Sample Number | Pulverized Coal, Wt. % | #6 Residual Fuel, Wt. % | Stability Additive, Wt. % |
| 38-6-B22 | 49.60 | 50.14 | 0.26 |
| 54-2-B22 | 49.60 | 50.14 | 0.26 |

In preparing the mixtures, as well as the other mixtures herein described, the following procedures are observed.

(1) The #6 Fuel Oil is preheated to a temperature of 120°+2° F.

(2) The desired amount of #6 Fuel Oil is weighed and placed into a clean, dry, 400 cc beaker.

(3) The desired amount of additive is added to the #6 Fuel Oil.

(4) A 3 inch mixer blade rotating at approximately 1500 RPM for 10 minutes or until the oil/additive blend reaches 150° F. is used to mix the components.

(5) Into a clean, dry, 250 cc beaker, the appropriate amount of pulverized coal is weighed.

(6) When the oil/additive blend reaches 150° F. the coal is transferred into the 400 cc container under aggitation, making sure a distinct coal layer is not formed on the oil, and no coal is lost during the process.

(7) After the coal is completely transferred, the mixture is stirred for 15 minutes to produce the final product.

Table III shows viscosity data for the two samples so prepared:

TABLE III

| Sample No. | Shear Rate, $Sec^{-1}$ | Viscosity, Cps | | |
|---|---|---|---|---|
| | | 140° F. | 160° F. | 180° F. |
| 38-6-B22 | 3.4 | 6475 | 3250 | 1800 |
| 38-6-B22 | 17 | >5000 | 2710 | 1530 |
| 38-6-B22 | 34 | >2500 | 2380 | 1458 |
| 54-2-B22 | 3.4 | 7750 | 2500 | 1250 |
| 54-2-B22 | 17 | 4730 | 1760 | 1075 |
| 54-2-B22 | 34 | >2500 | 1502 | 940 |

To test the stability of the two samples they are tested after storage under identical conditions for 24 days. The tests employed are a hand probe test and a K-scan test using a comercially available K-scan apparatus manufactured by Poly Chem Inc. The hand probe test consists of inserting a metal probe into the sample. The procedure is performed twice per sample, first to determine the length of any separated oil layer and second to determine what type of sediment, if any, has occurred. The test results are given in Table IV.

TABLE IV

| Coal/Oil Mixture Stability Information ("Hand-Probe" Method) | |
|---|---|
| Sample Number | |
| 38-6-B22 | Length of oil layer, in. - 1.25 Consistency of Blend-Blend appeared homogeneous in nature with a high degree of flocculation among the coal particles. This phenomenon resulted in a blend that was very easily sheared. |
| 54-2-B22 | Length of oil layer, in. - 1.50 Consistency of Blend - At the end of the twenty-four day period this blend contained sediment of the |

TABLE IV-continued

Coal/Oil Mixture Stability Information ("Hand-Probe" Method)

| Sample Number | |
|---|---|
| | soft-medium type, making the blend more difficult to shear than 38-6-B22. |

The higher degree of settling for the prior art stabilizer was confirmed by the K-scan test results.

EXAMPLE II

To further compare the stabilizer of the present invention to a prior art stabilizer, i.e., dicocodimethylammonium chloride described in Japanese Patent Application No. 53-123408 published Oct. 27, 1978, is utilized. The prior art stabilizer is designated 186-1. The stabilizer of Example I is also used. The samples are prepared in accordance with the procedures and coal and oil described in Example I, and similar tests are performed. Details are provided in Tables V-VII below.

TABLE V

| | Coal/Oil Mixture Preparation | | |
|---|---|---|---|
| Sample Number | Pulverized Coal, Wt. % | #6 Fuel Oil, Wt. % | Additive Wt. % |
| 38-6-B22 | 49.60 | 50.14 | 0.26 |
| 186-1 | 49.60 | 50.14 | 0.26 |

TABLE VI

| | Viscosity Measurements | | | |
|---|---|---|---|---|
| Sample No. | Shear-Rate (Sec $^{-1}$) | Viscosity cPs | | |
| | | 140° F. | 160° F. | 180° F. |
| 186-1 | 3.4 | 6,000 | 2,876 | 2,175 |
| 186-1 | 17 | 4,795 | 2,420 | 1,660 |
| 186-1 | 34 | 2,500 | 2,150 | 1,482 |
| 38-6-B22 | 3.4 | 6,475 | 3,250 | 1,800 |
| 38-6-B22 | 17 | 5,000 | 2,710 | 1,530 |
| 38-6-B22 | 34 | 2,500 | 2,380 | 1,458 |

TABLE VII

| Stability Information ("Hand-Probe" Method) | | |
|---|---|---|
| Sample Number | Oil Layer Length, in. | Consistency of Blend |
| 38-6-B22 | 1.25 | Blend appeared homogeneous with a high degree of flocculation among the coal particles making the blend extremely easy to stir. |
| 186-1 | 1.50 | Blend became more viscous in the direction of the bottom of the sample tube, even though the blend was quite soft throughout. |

K-scan data confirms the hand-probe observations. The stabilizer of the present invention produces a better stabilized mixture.

EXAMPLE III

The stabilized coal oil mixtures of the present invention may also be prepared by forming the stabilizer in situ in the coal-oil mixture. Such a procedure may be practiced as follows.

A coil-oil mixture stabilized with a quaternary ammonium hydroxide is prepared in the following manner. To 86.8 grams of the coal described in Table I is added 87.13 grams of the fuel oil described in Table I. To the mixture is added 0.61 grams of LiOH.H$_2$O and 0.46 grams of the heretofore described Arquad 2C-75. The mixture is stirred. In comparison to an identical coal-oil mixture, but stabilized with just the Arquad 2C-75, the stabilizer of the present invention shows substantially improved results including stability characteristics.

EXAMPLES IV AND V

In order to test the suitability of in situ formation of the quaternary ammonium hydroxide using potassium hydroxide or calcium hydroxide the following two preparations are made. Example III was repeated exactly except 0.35 grams of the potassium or calcium hydroxide was substituted for the lithium hydroxide monohydrate.

The quaternary ammonium hydroxides are apparently not formed and the stabilities of the coal-oil mixtures are found to be inferior to the mixture using Arquad 2C-75 as the stabilizer.

Having thus described our invention, we claim:

1. A stable, combustible coal-oil mixture comprising about 30 to about 50% by weight of a solid particulate carbonaceous material,
a liquid hydrocarbon fuel,
about 0.05 to 5.0% by weight of a stabilizer having the following structural formula:

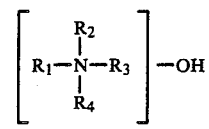

wherein R$_1$, R$_2$, R$_3$ and R$_4$ are alkyl groups having from 1 to 25 carbon atoms.

2. The mixture of claim 1 wherein R$_1$ and R$_3$ are alkyl groups having a chain length of from 1 to 12 carbon atoms and R$_2$ and R$_4$ are alkyl groups having a chain length of from 1 to 5 carbon atoms.

3. The mixture of claim 2 wherein the mixture comprises about 30 to 50% by weight coal and about 69% to 49% by weight liquid hydrocarbon fuel.

4. The mixture of claim 3 wherein the stabilizer is the reaction product of a quaternary ammonium chloride salt with a molar excess of sodium hydroxide or lithium hydroxide.

5. The mixture of claim 4 wherein the stabilizer is mixed with an alcohol.

6. The mixture of claim 4 wherein the stabilizer is prepared in situ the mixture of the carbonaceous material and the liquid hydrocarbon fuel.

7. The mixture of claim 4 wherein the carbonaceous material is coal and the liquid hydrocarbon fuel is fuel oil.

8. The mixture of claim 5 wherein said alcohol is an aliphatic alcohol having 1 to 10 carbon atoms.

* * * * *